United States Patent [19]

Kurihara et al.

[11] Patent Number: 5,750,261
[45] Date of Patent: May 12, 1998

[54] MAGNETIC RECORDING MEDIUM COMPRISING MAGNETIC PARTICLES, BINDER, AND A CURE AGENT OF ISOCYANURATE TRIMERS, PENTAMERS AND HEPTAMERS

[75] Inventors: Kenichi Kurihara; Masafumi Ata; Masataka Matsute; Haruo Watanabe, all of Kanagawa, Japan

[73] Assignee: Sony Corporation, Tokyo, Japan

[21] Appl. No.: 674,880

[22] Filed: Jul. 3, 1996

[30] Foreign Application Priority Data

Jul. 7, 1995 [JP] Japan .................. 7-195791

[51] Int. Cl.⁶ .................................................. G11B 5/702
[52] U.S. Cl. .......................... 428/422.8; 428/425.9; 428/694 BY; 428/694 BB; 428/900
[58] Field of Search ................. 428/422.8, 425.9, 428/694 BY, 694 BB, 900

[56] References Cited

U.S. PATENT DOCUMENTS

| | | | |
|---|---|---|---|
| 4,388,245 | 6/1983 | Ueyanagi et al. | 260/453 |
| 4,868,060 | 9/1989 | Ryoke et al. | 428/422.8 |
| 5,543,226 | 8/1996 | Bobrich et al. | 428/423.1 |

*Primary Examiner*—Stevan A. Resan
*Attorney, Agent, or Firm*—Hill & Simpson

[57] ABSTRACT

A magnetic recording medium comprising a non-magnetic base layer and an magnetic layer provided thereon which comprises a magnetic powder and a binder cured with a curing agent, wherein said binder has the hydroxyl group and said curing agent is a mixed polyvalent isocyanate compound comprising oligomers made of a diisocyanate monomer, wherein 50% by weight or more of said mixed compound comprises said oligomers which have polymerization degrees of 7 or less. The curing agent improves curing properties of the binder, and the magnetic recording medium produced therewith is excellent in sliding durability.

7 Claims, 1 Drawing Sheet

FIGURE
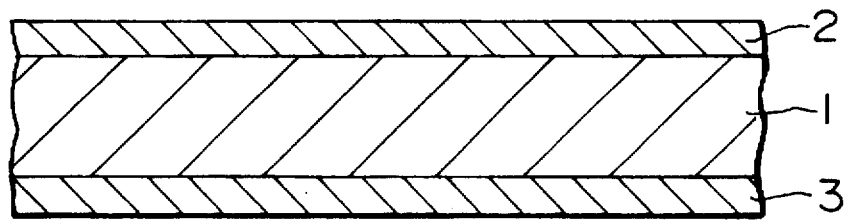

MAGNETIC RECORDING MEDIUM COMPRISING MAGNETIC PARTICLES, BINDER, AND A CURE AGENT OF ISOCYANURATE TRIMERS, PENTAMERS AND HEPTAMERS

BACK GROUND OF THE INVENTION

1. Field of the Invention

The present invention relates to a magnetic recording medium, such as a magnetic tape, comprising a magnetic layer which contains a magnetic powder and a binder as the principal components, and more particularly, relates to a coating-type magnetic recording medium having a magnetic coating film as a magnetic layer, and also relates to a method for producing the same.

2. Description of the Related Arts

In general, to form a magnetic layer on a magnetic recording medium such as a magnetic tape, a magnetic coating material is applied to a non-magnetic base film such as polyethylene terephthalate, and then, is dried and cured, wherein the magnetic coating material comprises a magnetic powder, a binder (a resin binder), an organic solvent, a curing agent, an additive and other essential components.

Recently, however, miniaturization and higher resolution are required in the field of magnetic recording, especially in video systems, audio systems, computers and magnetic recording media such as magnetic recording tapes, magnetic disks and the like used for such systems and the like. To satisfy the above requirements, magnetic recording media are required to have much higher density with high reliability. For that reason, magnetic powders have been produced in the form of much finer particles. At the same time, the need for high dispersibility and high packing properties is rising.

As magnetic recording media have increasingly higher densities, iron or other ferromagnetic metal materials which predominantly contain iron have been used as the magnetic powder material of the magnetic recording media, instead of the iron oxide materials that have been conventionally and widely used. Recently, magnetic powders are having the form of extremely fine particles becoming available in response to the demand for higher magnetic recording densities. Use of such a magnetic powder for a magnetic recording medium has brought about high recording density and excellent electromagnetic transducing properties in the high-frequency region.

However, when such fine particles of ferromagnetic metal powder are used for a magnetic recording medium, the specific surface of the medium increases and the magnetic powder becomes less dispersive. The magnetic layer of the medium, therefore, can not in many cases have both high density and stability, which causes some problems. For example, the fine particles of the ferromagnetic metal easily fall from the surface of the medium during sliding, or organic ingredients derived from the surface and having a low molecular weight adhere to the surface of the magnetic heads.

Though such problems can be attributed to the properties of the magnet powder and the binder for binding the powder, it is considered that they also can be attributed to the action of the curing agent used for three-dimensional crosslinking of the binder. In fact, the crosslinking efficiency of binders commonly used is 50% or less, though it depends on the types of the binders.

With such low crosslinking efficiency, the mechanical properties of the coating film can not be improved, and besides, troubles like head clog are caused due to the residue of non-crosslinked ingredients (low molecular ingredients) remaining on the coating film.

For many years, numerous investigations have been carried out on curing agents and curing conditions. As to curing agents, for example, monomers having a functional group of isocyanate and the methods for producing the same have been studied. As to curing conditions, though use of a high curing temperature may be considered as a remedy for the above problems, it is inevitably limited because the curing temperature can not be set above the glass transition temperature of the binder or the base film. Accordingly, further study in curing agents themselves is necessary in order to improve the crosslinking efficiency.

OBJECT AND SUMMARY OF THE INVENTION

Curing agents being used at present are principally classified into two types, an adduct type and a trimer type. The former includes curing agents consisting of a diisocyanate monomer which is to be polymerized with trihydric alcohol or the like, and the latter includes curing agents consisting of a monomer which is to be self-polymerized using a catalyst or the like. In both types of curing agents, various methods have been attempted to improve curing efficiency. For example, monomers as raw material are modified to make the isocyanate groups highly reactive and mobile, or curing agents are modified to have a high number of isocyanate groups per molecule.

To make the isocyanate groups highly reactive and mobile, further study should be carried out in view of using diisocyanate monomers as the raw material for the curing agents. However, the prior art has not yet simultaneously satisfied both high reactivity and mobility.

For example, to raise the reactivity of a curing agent, it is important that the isocyanate group is directly substituted in an aromatic ring which is electron attractive. Such monomers are, for example, MDI (4,4'-diphenylmethane diisocyanate and TDI (toluene diisocyanate). However, in the isocyanate groups of such monomers, mobility in the solid state reaction is limited and the reactivity is low as compared to that of the isocyanate groups in straight-chain monomers like HDI (hexane diisocyanate).

There are some methods to overcome the above-mentioned drawbacks, for example, by introducing a highly electron attractive group such as F or Cl halogen, $NO_2$, $SO_2$, or CF. Such methods are, however, unsuitable because they complicate the composition of the curing agent and further limit the mobility of the isocyanate groups.

Meanwhile, to obtain higher mobility, the following methods may be employed: use of a straight-chain structure instead of the benzene ring as described above, and introduction of the alkyl chain between the benzene ring and the isocyanate group. Both of these methods, however, further decrease the reactivity of the isocyanate groups, and therefore, can not achieve high crosslinking efficiency.

Moreover, if a new diisocyanate monomer is created and improved in terms of both reactivity and mobility, it would cost more than TDI or MDI monomers which are commercially available at present. It is, therefore, desirable to still use conventional monomers in the development of a curing agent.

In contrast, by methods for increasing the number of isocyanate groups per molecule, the crosslinking efficiency can easily be raised since the commercially available diisocyanate monomers can be used and the number can be adjusted in the subsequent synthetic processes.

The curing agents are actually added in an amount of some tens % of the weight of the binder. Therefore, a curing agent having a higher number of isocyanate groups per unit weight is advantageous in respect of the crosslinking reaction.

As described above, curing agents are principally classified into two types, namely, curing agents which consist of a diisocyanate monomer bonded using trihydric alcohol or the like; and curing agents which consist of a self-polymerized monomer. Provided that both types of curing agents have equal reactivity, the latter curing agents would be advantageous in the crosslinking reaction because the number of isocyanate groups per unit weight would be higher than that of the former curing agents.

Additionally, in the comparison of the latter curing agents themselves, the curing agents which have a highly polymerized structure, as described below, would have superior crosslinking efficiency than those having a trimer structure, as described below. This is also because the number of isocyanate groups per molecule would be higher in the former than in the latter.

In detail, the three-dimensional crosslinking structure can be formed with at least two isocyanate groups for the reaction. Therefore, in the trimer which contains a isocyanurate the same structure as Chemical Formula 1 described below, at least two of the three isocyanate groups should react while only at least two of the seven isocyanate groups should react in the heptamer which also contains the same isocyanurate rings as Chemical Formula 2 described below. Accordingly, the probability of an occurrence of the crosslinking reaction becomes higher in curing agents comprising an oligomer composed of a monomer self-polymerized at a higher polymerization degree. The curing agents commercially available actually contain such oligomers.

Chemical Formula 1

TDI Trimer

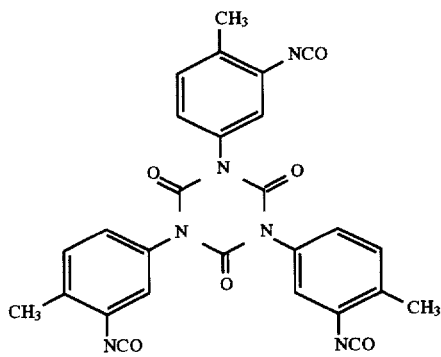

Chemical Formula 2

TDI Heptamer

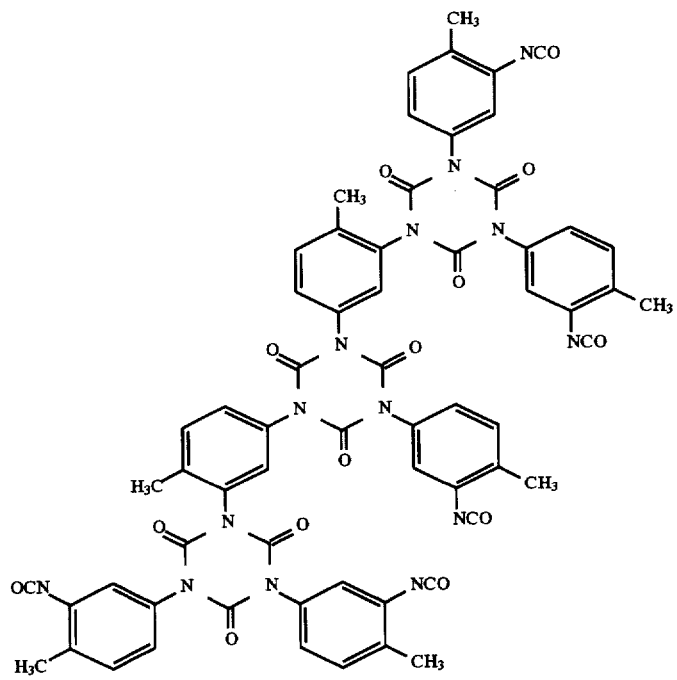

In fact, when the polymerization degree becomes higher in an oligomer constituting the curing agent, the number of isocyanate groups per molecule increases and the crosslinking reaction progresses steadily. However, at the same time, since the oligomer constituting the curing agent becomes more rigid in structure, not all of the isocyanate groups can react with the hydorxyl groups in the binder, and unreacted curing agents will increase. Further, the crosslinking sites would be reduced because the number of diisocyanate oligomer also decreases. Accordingly, the sliding durability of magnetic recording medium has not yet been remarkably improved though the crosslinking ability appears to have been improved.

The present invention is accomplished in the light of the above-mentioned circumstances. The object of the present invention is, therefore, to improve the curing properties of binders used for magnetic recording media, and to provide thereby a magnetic recording medium which is excellent in sliding durability.

The inventor has earnestly and ardently investigated to accomplish the above-described objects from various aspects. As a result, the inventor has found that crosslinking efficiency can be improved and satisfactory curing reaction can be obtained by reducing the polymerization degrees of the isocyanate oligomers used for the curing agent and by appropriately adjusting the amount of the specified oligomers in the curing agent, and finally accomplished the present invention.

Accordingly, one aspect of the present invention is a magnetic recording medium comprising a magnetic layer which contains a magnetic powder and a binder as the principal ingredients, more particularly, comprising a magnetic layer which consists of a magnetic coating composed predominantly of a binder and a magnetic powder and which is provided on a non-magnetic substrate, characterized in that said binder has the hydroxyl group and that a curing agent to be used is a mixed polyvalent isocyanate compound which comprises oligomers made of a diisocyanate monomer having an isocyanurate ring or an urethodione group, wherein 50% by weight or more of said mixed compound comprises said oligomers which have polymerization degrees of 7 or less.

Among the curing agents commercially available at present, almost all that have an isocyanurate ring contain totally 50% by weight or more of oligomers which have polymerization degrees of 15 or more. The magnetic recording medium produced using such a curing agent appears to have a good crosslinking ability and, conversely, does not have a markedly improved durability in actual use. This is because there exist many unreacted isocyanate groups in the medium as described above.

In contrast, the curing agent according to the present invention is improved in its crosslinking ability by use of diisocyanate oligomers having polymerization degrees of 7 or less in a total content of 50% by weight or more. A total content of 70% by weight or more is much more effective.

In view of the number of isocyanate groups per molecule, the crosslinking efficiency becomes higher in a curing agent which contains the diisocyanate oligomers having much isocyanate groups such as the pentamer or the heptamer than in a curing agent which contains only trimer. The effect of the use of such oligomers appears remarkable when, for example, at least either of the pentamer or the heptamer is contained in a content of 30% by weight or more.

However, oligomers having polymerization degrees of 9 or more are unsuitable because unreacted isocyanate would increase and the crosslinking sites decrease as described above, though the probability of the occurrence of the crosslinking reaction may be raised. Consequently, oligomers having polymerization degrees of about 5–7 are suitable to obtaining the most efficient crosslinking reaction. Additionally, though the crosslinking ability may slightly become low, some of diisocyanate monomers may be contained in the form of an urethodione group or a trimer structure.

The polyvalent isocyanates available in the present invention may include the above-mentioned TDI heptamer, TDI pentamer and TDI trimer; MDI oligomers; HDI oligomers; and other polyvalent isocyanate oligomers.

In the present invention, the total amount of the above-described polyvalent isocyanates to be used as a curing agent is preferably 2–30% by weight relative to the total weight of the resin (binder). With a total amount below 2% by weight, the abrasion resistance of the magnetic layer would not be sufficiently improved. With a total amount exceeding 30% by weight, the magnetic layer would be hard due to the excess crosslinkings, which may reduce the effect of calendaring, may decrease the content of magnetic powder in the coating, and besides, may deteriorate the electromagnetic transducing properties.

BRIEF DESCRIPTION OF THE DRAWING

The FIGURE is a structural and sectional view of an example of the magnetic recording medium according to the present invention.

DETAILED DESCRIPTION OF THE PREFERRED EMBODIMENTS

As the binder which may be used in the present invention, a binder resin which has 2–10 of active hydrogens per molecule and at least one polar group of at least one type selected from the group consisting of —COOM, —SO$_3$M, —OSO$_3$M, —PO$_3$M and —OPO$_3$M, wherein M is alkali metal such as Na or K; or alkyl group such as methyl group or ethyl group is preferable. The active hydrogens can react with the organic isocyanates, and the polar group is contained to raise the dispersion of the magnetic powder.

The binder resin used in the present invention is not limited as long as it does not deteriorate the dispersion of the magnetic powder and does not severely reduce the heat resistance or the abrasion resistance of the product. Such binder resin may include any one of publicly known binders such as vinyl chloride resins, polyester resins, polyurethane resins and polyester-polyurethane resins.

A preferred example of the vinyl chloride resins to be used may be a copolymer such as a vinyl chloride-vinyl alcohol copolymer to which the phosphate group, the sodium sulfonate group, the potassium sulfonate group, or any one of amine salts of phosphoric or sulfonic acid is introduced; or a vinyl chloride-hydroxypropyl acrylate copolymer, a vinyl chloride-hydroxyethyl acrylate copolymer, a vinyl chloride-hydroxypropyl methacrylate copolymer, or a vinyl chloride-hydroxyethyl methacrylate copolymer to which the phosphate group or the sulfonate group is introduced. Additionally, these vinyl chloride copolymers may be further copolymerized with a monomer containing an epoxy group. A specific example of polymers of this type is MR 110 manufactured by Nippon Zeon Co., Ltd.

Further, various types of binder resins to which a polar group is introduced at the principal chain or the side chain of the resin may be used together with the above-mentioned vinyl chloride copolymers. Examples of such binder resins may include a polyurethane resin or a polyester polyurethane to which any one of metal salts of sulfonic acid, the carboxyl group, or the phosphate group is introduced. Examples of the magnetic powder used in the present invention may broadly include γ-Fe$_2$O$_3$ powder, γ-Fe$_2$O$_3$ powder containing Co, CrO$_2$ powder, Fe powder, Co powder, Co-ferrite powder, Ba-ferrite powder, and any other magnetic powders that are conventionally and publicly known. Practically, the above-described magnetic powders having BET specific surface of 45 m$^2$/g or more are contained at a high packing density and highly oriented to obtain magnetic recording media having high performance.

Usually, particles of a non-magnetic solid additive are added to magnetic coating material. Such particles may be abrasive particles generally used for magnetic recording media, and preferably used are, for example, particles of α-Al$_2$O$_3$ powder, Cr$_2$O$_3$ powder, α-Fe$_2$O$_3$ powder, ZrO powder, TiC powder, SiC powder, BN powder, or TiO$_2$ powder. Here, use of the above-described particles surface-treated with an organosilazane compound brings about more excellent dispersion of the particles and inhibition of falling out of the particles from the surface of the media, and therefore, the resultant magnetic recording media are much improved in the durability against continuous sliding.

Moreover, the magnetic coating material may optionally contain a dispersant such as lecithin, a lubricant such as an ester of stearic acid, an antistatic agent such as carbon black, an abrasive such as alumina, a rust preventive, and/or other additives. Any materials that are conventionally used and publicly known can be used as the dispersant, the lubricant, the antistatic agent, the abrasive, and other additives without limitation.

The non-magnetic base film available for the magnetic recording medium of the present invention may be any of polyesters or aramids such as polyethylene terephthalate or polyethylene-2,6-naphthalate, and may take any suitable form of a film, a sheet, a tape, or a disk. The surface of the base film may be provided with an intermediate layer or an under-coating layer for sufficient adhesion of the magnetic layer.

The magnetic recording medium of the present invention may be produced by any usual or conventional method for producing magnetic recording media. In an example of the method, a magnetic coating material is prepared by mixing a magnetic powder, a polyurethane resin having metal salts of sulfonic acid and —OH radicals, a curing agent, a vinyl chloride copolymer to which a polar group selected from the phosphate group, metal salts of sulfonic acid and the derivatives thereof is introduced, and others, followed by mixing and dispersing together with an organic solvent, particles of a non-magnetic solid additive and other additives. The resultant magnetic coating material is then applied to a substrate such as a polyester film by any suitable way such as spray coating or roll coating, and is dried.

The organic solvent used herein may be methyl ethyl ketone, cyclohexane, methyl isobutyl ketone, toluene, tetrahydrofuran, dioxane, dimethylformamide, ethyl acetate, or mixture thereof.

In the above, only the basic composition of the magnetic recording medium according to the present invention is described. The composition of the magnetic recording medium according to the present invention is not limited in the above description, and of course, may be modified. For example, a back coating layer which is composed predominantly of a magnetic or non magnetic powder and a binder may be provided on the side of the non-magnetic base film opposite to the side where the magnetic layer is formed.

While carbon black is usually used as a principal ingredient of the non-magnetic powder for the back coating layer, calcium carbonate, alumina, titanium oxide, or α-iron oxide may be also used. Any magnetic powder described above for the magnetic layer may be used as the magnetic powder for the back coating layer solely or in combination thereof. Further, any of binders and other additives described above for the magnetic layer may also be used for the back coating layer solely or in combination thereof.

The magnetic recording medium of the present invention comprises a non-magnetic base film 1 and a magnetic layer 2 formed thereon, as described, for example, in FIGURE. A back coating layer 3 may be provided on the surface of the base film opposite to the magnetic layer 2, though this is not essential. Additionally, an over coating layer may be provided on the magnetic layer.

The following examples are presented to illustrate the present invention but are not intended to limit the scope of the present invention.

Preparation of Magnetic Coating Material and Production of Magnetic Recording Medium A magnetic coating material was prepared with the below-described composition.

Needle shaped magnetic particles of metallic iron for the magnetic recording medium (specific surface 53.9 cm$^2$/g, coercive force Hc=1580 Oe, saturation

| | |
|---|---|
| magnetization σs = 120 emu/g) | 100 parts by weight |
| Thermoplastic polyurethane (mean molecular weight 20,000) | 12.5 parts by weight |
| Vinyl chloride-vinyl propionate-vinyl alcohol copolymer (degree of polymerization 250–350) | 12.5 parts by weight |
| Carbon (mean particle diameter 150 nm) | 5 parts by weight |
| α-alumina (mean particle diameter 200 nm) | 5 parts by weight |
| Polyisocyanate curing agent | 2.5 parts by weight |
| Olive oil | 1 part by weight |
| Solvent mixture (methyl ethyl ketone:methyl isobutyl ketone:toluene = 2:1:1) | 220 parts by weight |

The above materials were mixed using a ball mill for 48 hours, and then 5 parts by weight of polyisocyanate curing agent was added and mixed for 30 min.. The resultant is applied to polyethylene terephthalate film having a thickness of 12 μm to have the coating thickness after drying of 6.5 μm. After drying, the film was cut to obtain magnetic tapes having a width of 8 mm.

EXAMPLES 1–11

Magnetic tapes (Sample tapes 1–11) were produced according to the above-described method using the isocyanate curing agents composed of oligomers of the diisocyanate monomer, namely, some oligomers of TDI, the respective contents of the oligomers in each of said curing agents being as described in Table 1.

COMPARATIVE EXAMPLES 1–5

Magnetic tapes (Comparative tapes 1–5) were produced according to the above-described method using the isocyanate curing agents composed of oligomers of the diisocyanate monomer, the respective contents of the oligomers in each of said curing agents being as described in Table 1.

Solvent resistance, falling out of the powder particles, a still property, and a friction factor were measured in each of the above-prepared magnetic tapes by the following methods. The results are shown in Table 2.

Solvent Resistance

The magnetic coating was rubbed with a gauze soaked with methyl ethyl ketone. The solvent resistance was evaluated in terms of the repetition number of rubbing until the coating had been dissolved to be completely disappeared. The rubbing was performed at most 200 times in each tape.

Falling Out of the Powder Particles

Using an 8 mm-tape-video deck, the amount of the powder particles adhering to a guide pin, which had fell out from the tape, was visually measured after sliding of 100 passes, and evaluated with ranks of 1 (largest amount), 2, 3, 4 and 5 (smallest amount, namely, the best in this property).

Still Property

The time (by minute) until the reproducing output level became half of that obtained in the first reproducing was measured by a system which was a 8 mm-tape-video deck modified for the durability test, namely, it possessed a rotating drum, had recording/reproducing functions, and was capable of following the output level variation at a determined zone of the tape. A higher value means more excellent durability. The measurement was performed at most for 120 min..

Friction Factor

A friction factor of each tape against a stainless guide pin of the deck was measured at the time when the tape underwent 100 cycles of shuttle sliding in the deck. A smaller value means that the friction factor is also smaller.

TABLE 1

| | Contents of Oligomers in Polyisocyanate Curing Agents (% by weight) | | | |
|---|---|---|---|---|
| | Trimer | Pentamer | Heptamer | Nonamer or More |
| Example 1 | 10 | 20 | 20 | 50 |
| Example 2 | 10 | 20 | 30 | 40 |
| Example 3 | 20 | 30 | 10 | 40 |
| Example 4 | 40 | 20 | 10 | 30 |
| Example 5 | 40 | 10 | 20 | 30 |
| Example 6 | 20 | 20 | 30 | 30 |
| Example 7 | 10 | 30 | 30 | 30 |
| Example 8 | 40 | 20 | 20 | 20 |
| Example 9 | 10 | 40 | 30 | 20 |
| Example 10 | 10 | 40 | 40 | 10 |
| Example 11 | 10 | 20 | 40 | 30 |
| Comparative Example 1 | 10 | 20 | 10 | 60 |
| Comparative Example 2 | 20 | 10 | 10 | 60 |
| Comparative Example 3 | 10 | 10 | 10 | 70 |
| Comparative Example 4 | 10 | 10 | 0 | 80 |
| Comparative Example 5 | 0 | 0 | 10 | 90 |

*TDI oligomers were used in Examples 1–11 and Comparative Examples 1–5.

TABLE 2

| | Solvent Resistance (times of rubbing) | Falling Out of the Powder Particles | Still Property | Friction Factor |
|---|---|---|---|---|
| Example 1 | 120 | 3 | 60 | 0.27 |
| Example 2 | 150 | 3 | 80 | 0.27 |
| Example 3 | 150 | 4 | 100 | 0.25 |
| Example 4 | 140 | 4 | 100 | 0.25 |
| Example 5 | 150 | 4 | 120 | 0.25 |
| Example 6 | 180 | 4 | 120 | 0.24 |
| Example 7 | >200 | 5 | >120 | 0.22 |
| Example 8 | 170 | 4 | 100 | 0.24 |
| Example 9 | >200 | 5 | >120 | 0.21 |
| Example 10 | >200 | 5 | >120 | 0.21 |
| Example 11 | 200 | 5 | >120 | 0.23 |
| Comparative Example 1 | 140 | 2 | 60 | 0.28 |
| Comparative Example 2 | 140 | 2 | 60 | 0.29 |
| Comparative Example 3 | 150 | 1 | 50 | 0.29 |

TABLE 2-continued

| | Solvent Resistance (times of rubbing) | Falling Out of the Powder Particles | Still Property | Friction Factor |
|---|---|---|---|---|
| Comparative Example 4 | 180 | 1 | 45 | 0.31 |
| Comparative Example 5 | 180 | 1 | 45 | 0.32 |

As obvious from the result shown in Table 2, compared to Comparative Examples 1–5, though some Examples had not been improved in solvent resistance as an index of the crosslinking ability, outstanding improvement in the sliding durability, namely, the falling out of the powder particles, the still property, and the friction factor was observed in Examples 1–11 that were produced with the curing agents containing 50% by weight or less of oligomers which consist of the diisocyanate monomer and have polymerization degrees of 7 or less. Particularly excellent sliding durability was observed in Examples 5–11 that were produced with the curing agents containing 70% by weight or more of the oligomers having polymerization degrees of 7 or less, or in Examples 7, 9, and 10 that were produced with the curing agents containing totally 30% by weight or more of the pentamer and/or heptamer.

From the above results, it has been clarified that excellent sliding durability can be obtained in a magnetic recording medium produced with a curing agent containing 50% by weight or more of oligomers consisting of a diisocyanate monomer and having polymerization degrees of 7 and/or less. Also, excellent sliding durability can be obtained when the curing agent has the isocyanurate ring or the urethodione group.

Additionally, it has been proved with below Examples 12–16 that the same effects as described above can also be obtained when MDI or other material is used for the curing agent as long as the content of the oligomers constituting the material and having polymerization degrees of 7 or less is 50% by weight or more.

EXAMPLES 12–16

Magnetic tapes (Sample tapes 12–16) were produced according to the same method used in the above-described Examples 1–11 except that MDI oligomers were used in the respective contents shown below in Table 3.

COMPARATIVE EXAMPLES 6–7

Magnetic tapes (Comparative tapes 6–7) were produced according to the same method used in the above-described Examples 12–16 except that the contents of MDI oligomers were not in accordance with those of the present invention.

Each measurement relating to the characteristics of the tapes was carried out in the same manner as described above. The results are shown in Table 4.

TABLE 3

| | Contents of Oligomers in Polyisocyanate Curing Agents (% by weight) | | | |
|---|---|---|---|---|
| | Trimer | Pentamer | Heptamer | Nonamer or More |
| Example 12 | 10 | 20 | 20 | 50 |
| Example 13 | 10 | 20 | 30 | 40 |
| Example 14 | 20 | 20 | 30 | 30 |
| Example 15 | 10 | 30 | 30 | 30 |
| Example 16 | 10 | 40 | 40 | 10 |
| Comparative Example 6 | 10 | 10 | 10 | 70 |
| Comparative Example 7 | 0 | 0 | 10 | 90 |

*MDI oligomers were used in Examples 12–16 and Comparative Examples 6 and 7.

TABLE 4

| | Solvent Resistance (times of rubbing) | Falling Out of the Powder Particles | Still Property | Friction Factor |
|---|---|---|---|---|
| Example 12 | 100 | 3 | 60 | 0.28 |
| Example 13 | 130 | 3 | 80 | 0.26 |
| Example 14 | 180 | 4 | 100 | 0.25 |
| Example 15 | >200 | 5 | >120 | 0.23 |
| Example 16 | >200 | 5 | >120 | 0.22 |
| Comparative Example 6 | 130 | 1 | 40 | 0.30 |
| Comparative Example 7 | 150 | 1 | 30 | 0.33 |

We claim:

1. A magnetic recording medium comprising:

a non-magnetic base layer; and a magnetic layer disposed on said base layer, said magnetic layer comprising a coating comprising:

100 parts by weight of a magnetic powder;

a resin binder comprising a 1:1 mixture of a polyurethane resin and a vinyl chloride copolymer resin having active hydrogen functionality and polar group functionality; and 2–30% by weight based on the total weight of the resin binder of a curing agent comprising a mixture of oligomers of diisocyanate monomers, said curing agent including 70% by weight or more of isocyanurate trimers, pentamers and heptamers of said diisocyanate monomers, at least 30% by weight or more of said curing agent being pentamers and/or heptamers.

2. A magnetic recording medium as defined in claim 1, wherein said diisocyanate monomers are aromatic diisocyanate monomers.

3. A magnetic recording medium as defined in claim 1, wherein said diisocyanate monomers are selected from toluene diisocyanate (TDI) or 4,4'-diphenylmethane diisocyanate (MDI).

4. A magnetic recording medium as defined in claim 1, wherein said resin binder is present in an amount of about 25 parts by weight.

5. A magnetic recording medium as defined in claim 1, wherein the resin binder comprises a thermoplastic polyurethane having a mean molecular weight of about 20,000 and a vinyl chloride-vinyl propionate-vinyl alcohol copolymer having a degree of polymerization of from about 250 to about 350.

6. A magnetic recording medium as defined in claim 1, wherein said magnetic layer further comprises abrasive particles.

7. A magnetic recording medium as defined in claim 1, wherein said resin binder is present in an amount of about 25 parts by weight and said curing agent comprises 70% by weight or more of isocyanurate trimers, pentamers and heptamers of said diisocyanate monomers, 30% by weight or more being heptamers.

* * * * *